Nov. 18, 1958         J. UTVITCH         2,860,869
ANNULAR SPRINGS AND METHOD OF MANUFACTURING THEM
Filed May 3, 1956

Nov. 18, 1958  J. UTVITCH  2,860,869
ANNULAR SPRINGS AND METHOD OF MANUFACTURING THEM
Filed May 3, 1956  3 Sheets-Sheet 2

Nov. 18, 1958     J. UTVITCH     2,860,869
ANNULAR SPRINGS AND METHOD OF MANUFACTURING THEM
Filed May 3, 1956
FIG.14
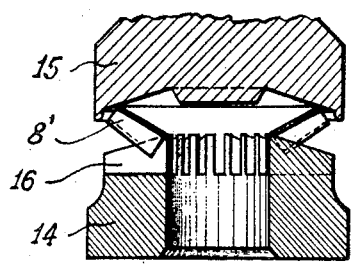
FIG.16
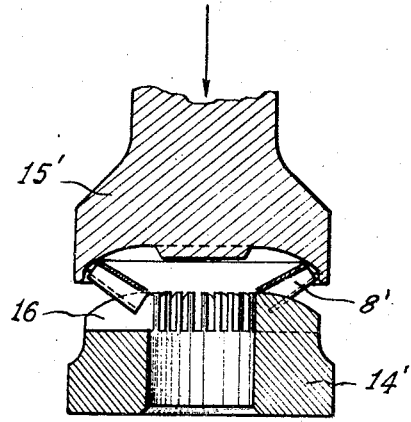
FIG.15
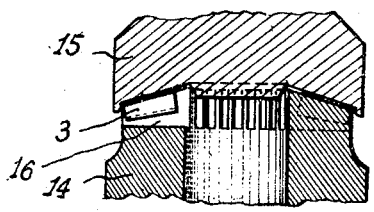
FIG.17
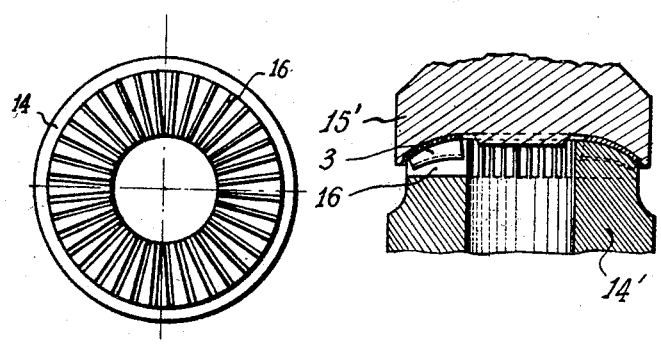
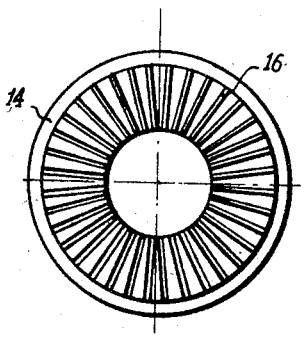
FIG.18

United States Patent Office 2,860,869
Patented Nov. 18, 1958

2,860,869
ANNULAR SPRINGS AND METHOD OF MANUFACTURING THEM

Jovan Utvitch, Paris, France, assignor to International Engineering General Research & Licensing Company, Wilmington, Del.

Application May 3, 1956, Serial No. 582,483
Claims priority, application France May 12, 1955
9 Claims. (Cl. 267—1)

This invention relates to improved annular springs, and to methods and apparatus for manufacturing them. The invention relates generally to the type of annular spring elements having radial slots therein to impart resiliency to the elements, such as spring washers and the like. Such elements are generally made from material having some inherent resiliency, and are radially slotted to define a number of equal sectors, the slots extending from the inner and/or the outer periphery of the annular element over part of the radial extent thereof. The elements generally have a somewhat tapered or arcuate cross section, so as to present resiliency in an axial direction, i. e. normally to the general plane of the annular element.

The amplitude of elastic deformation of which such elements are capable in an axial direction is usually low, thereby limiting the usefulness thereof. This is because the amount by which the element is able to yield or sag axially depends primarily upon the length of the radial slots therein; such length however cannot be increased above a certain limiting value for a given set of dimensions of the element, since such increase reduces the amount of material ensuring resilient interconnection between the sectors and correspondingly diminishes the resistance of the spring element. This statement holds whether the slots are all made to extend from a common periphery of the element e. g. the outer periphery thereof—or whether the slots also extend towards each other from the inner and outer periphery of the annular element. If, in an attempt to increase the yieldingness of the element, the lengths of the slots are increased so that the amount of solid material beyond the ends of the slots becomes too small, the yield limit of the metal will be exceeded even under moderate strain and the element will collapse. This is especially true where the element in use is subjected to varying or repeated compressive strains. Whereas the difficulty can be somewhat offset by the use of particularly strong, specially heat treated alloy materials, the fundamental problem remains since it is inherent to the design of such slotted elements.

It is the object of this invention to provide an improved annular spring element of the radially slotted type which will be free of the above specified inconveniences. An object is to provide an annular spring element which will possess greater resiliency or flexibility for a given set of dimensions and resistance of the element; conversely it is an object to provide an annular spring which will possess greater resistance for a given resiliency of flexibility.

Slotted annular springs of the known types have usually been produced by press stamping techniques. Because of the fineness of the slots that had to be provided, the press or stamping equipment used was expensive and fragile. Moreover it was found difficult to impart selected profiles to such annular springs, of the most appropriate form for given conditions in use, e. g. a predetermined arcuate or conical profile, because of the tendency of the element to buckle and to present elastic instability.

Objects of this invention include the provision of slotted annular springs which may be easily shaped to any desired cross sectional shape, and the provision of methods and tooling equipment for producing such improved annular springs economically.

In accordance with an aspect of this invention, the improved annular spring comprises an annular disc having a number of identical radial sectors each delimited from one another by radial folds or pockets and by radial slots on the same radius as the said pockets, which pockets are identical to one another and located on the same side of the annular disc, the said slots extending from at least one end of the said pockets and emerging at at least one of the circumferences of the said annular disc.

The resiliency of such a spring element can readily be controlled for a given type of constituent material and a given set of dimensions of spring, by acting on one or any combination of the following factors: depth, number and length of the pockets.

For a similar purpose, the pockets may also be formed with transverse cut outs of desired size and shape. Further, the pockets may have a U-shaped cross section or flattened to any symmetrical cross section. Radial cutouts may also be provided in the sides of the pockets.

The presence of pockets makes it possible to impart to the radial sectors of the annular spring according to this invention any desired profile, straight or arcuate, depending on the intended use of the spring. The spring can be made from materials having a relatively low elastic limit and expensive heat treatment can in many cases be dispensed with.

It has been observed that improved annular springs according to this invention and having shorter slots than the known annular springs with slots only but no pockets, offer a much higher resiliency and operational security.

The invention concerns also a manufacturing process which allows the production of the annular springs described above in a practical, rapid and economical way. This consists of the following:

(a) A metal strip is first folded, the number of folds being equal to the number of pockets required in the annular spring. The ends of this folded strip are welded together so as to form a tubular element, thus having the same number of identical folds as the said strip angularly equidistant from one another, these folds being radially disposed so that their lengths are parallel to the axis of the tubular element.

(b) This folded tubular element is then formed in a suitable press so as to obtain different diameters of the two ends, which gives it the form of a truncated cone ring.

(c) The said ring is then placed in another suitably equipped press which gives the final raw form of the annular spring.

(d) This raw annular spring is then machined in a lathe, milling machine, grinder or in any other equivalent machine tool, so as to obtain the radial slots by removal of one portion of the material of the pockets and, according to requirements, from the aforesaid sectors.

Some embodiments of the invention will be described in greater detail with reference to the accompanying drawings, given by way of illustration but not of limitation.

Figure 10:
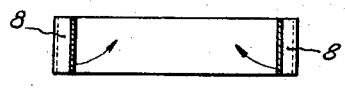
Figure 11:
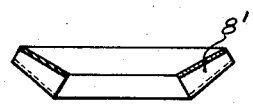
Figure 12:
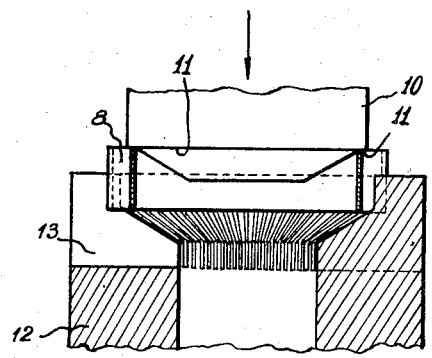
Figure 13:
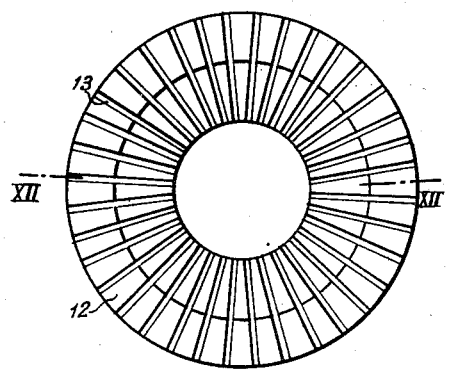

Figure 10 and 11 schematically depict steps in the process of converting the said tubular ring into a conical ring with folds, thus approaching an intermediate shape of the final raw spring;

Figure 12 illustrates in fragmentary cross section press equipment used for the process schematically represented by Figures 10 and 11;

Figure 13 is a plan view of the die, that is, the lower portion of the press equipment represented in Figure 12;

Figures 14 and 15 are sections of press equipment, respectively partly in open and partly in closed position, for imparting the final conical shape to the raw spring starting from the folded conical ring obtained with the equipment of Figure 12;

Figures 16 and 17 are sections of press equipment, respectively partly in open and partly in closed position, similar to that of Figures 14 and 15, but allowing an arcuate profile to be imparted to the raw spring, starting from the folded conical ring obtained with the equipment of Figure 12;

Figure 18 is a plan view of the die shown in Figures 14 and 15.

Figure 1:
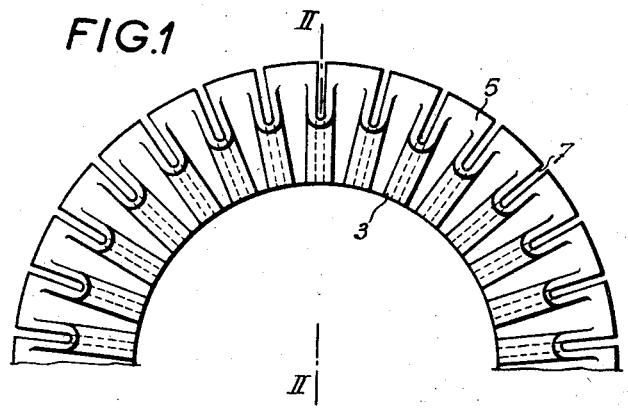
Figure 1 is a fragmentary plan view of an annular spring according to this invention.
Figure 2:
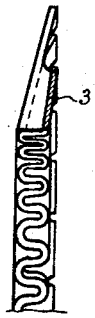
Figure 2 is a section on line II—II of Figure 1.

As shown in Figures 1 and 2, an example of an annular spring device according to this invention is an annular disc formed by a certain number of identical sectors 5 and an equal number of identical angularly equispaced pockets 3 disposed on one side of the spring, and the lips 6 (Figure 5) of which are disposed on the other side of this spring. The said pockets all extend from the inner periphery of the annular spring and terminate all at an equal distance from the geometrical center thereof. Slots 7 equal in number to the pockets have the same radial direction as the openings between the lips of the pockets and extend from the proximity of the ends of the pockets to the outer periphery of the spring. Thus, the annular spring according to this invention is constituted of a certain number of sectors interconnected by the whole quantity of material forming the pockets instead of by a short and weak quantity of material as in the case of the known annular springs.

The pockets 3, instead of extending from the inner periphery of the springs outwards as shown in Figures 1 and 2, can be made to extend from the outer periphery towards the center, in which case slots 7, corresponding individually with the pockets and having the same radial direction as the openings between the lips of the pockets, start from the inner periphery of the annular spring and terminate in the proximity of the pockets.

Figure 3:
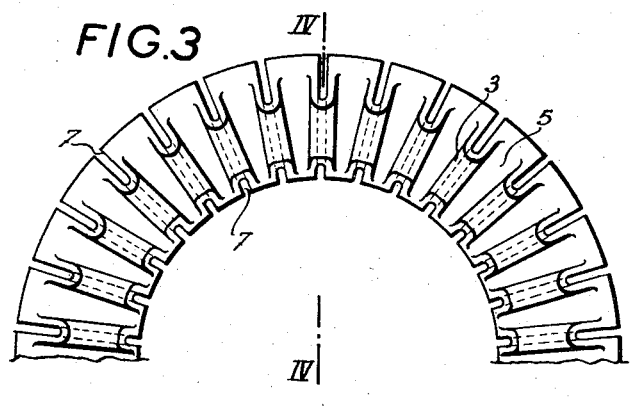
Figures 3 and 4 are views similar to Figures 1 and 2 relating to a modified embodiment.
Figure 4:
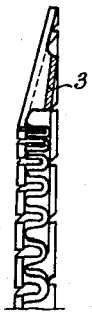

In the embodiment of Figures 3 and 4, a number of angularly equispaced, radially extending identical pockets 3 extend from an equal distance from the outer periphery and towards the center and terminate at an equal distance from the inner periphery; slots 7 extend from both the inner and outer peripheries of the annular spring along radii corresponding to the openings of the lips of the respective pockets and terminate in the respective proximities of the ends of said pockets.

Figure 5:
Figures 5 and 6 are sectional views illustrating two modified forms which the pockets may assume in cross section.
Figure 6:

The transversal cross section of the pockets 3 may be selected in accordance with the particular conditions of use of the finished annular spring, as well as the desired conditions of manufacture. Figures 5 and 6 illustrate two examples of transversal cross sections. By modifying the transversal cross sections of the pockets different resiliency characteristics can be given to the annular spring.

Figure 7:
Figure 7 is a section illustrating notches or cutouts which may be formed in pockets and/or sectors to modify the resiliency of the spring.
Figure 8:
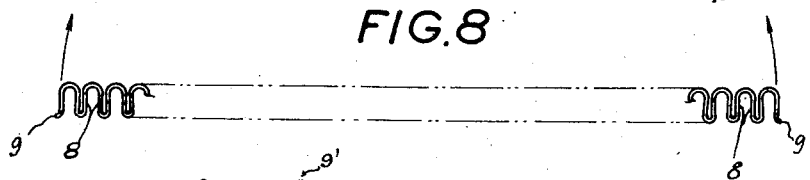
Figure 8 is a side view of a metal strip shaped to provide the number of folds desired to form the improved annular spring according to this invention.

In the example shown in Figure 7, part of the material of the sectors 5 and the sides of pockets 3 is shown to be cut out as at 4. In this example it will be noted that instead of imparting a conical form to the annular spring (rectilinear profile of sectors) as shown in Figures 2 and 4, a curved profile has been given to the sectors.

It will be understood that according to the various examples shown and described, these may be applied singly or in various combinations to obtain annular springs of widely varying characteristics.

It may be readily appreciated that the mechanical and fatigue resistances are enhanced owing to the increased quantity of material which constitutes the pockets which interconnect the sectors. It can equally be understood that this invention allows the use of more appropriate manufacturing methods, with less fragile and expensive equipment than that necessary up to now to cut out long and slender slots in the known annular springs. Production costs are thus lower to obtain annular springs of a very much higher elasticity than that of the known annular springs.

Figure 9:
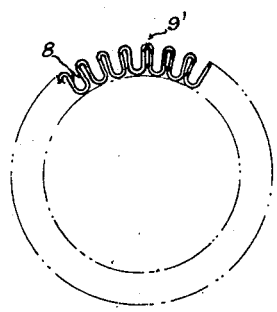
Figure 9 is a side view of the same element at a subsequent stage of manufacture of the annular spring, wherein the ends of the element have been welded to constitute a tubular ring with folds.

The method and tooling equipment will now be described with reference to Figures 8 to 18, whereby improved annular springs according to this invention (according to Figures 1 to 7) may be quickly and economically produced. As shown on Figure 8, a metal strip is first formed with folds 8 equal in number to that of the pockets in the annular spring to be produced. The folded spring is then bent to a circular shape as shown in Figure 9 so that the adjacent ends 9 thereof be welded as at 9' by electric arc or by any other method of welding, to obtain a folded tubular ring, as illustrated in axial cross section, Figure 10. It will be noted that the said tubular ring comprises a number of angularly equispaced, identical folds 8, their lengths being parallel to the axis of the tubular ring. This tubular ring Figure 10 is then converted into the form of a truncated conical ring as shown in Figure 11, by a stamping operation acting upon one edge (e. g. the lower edge in Figure 10) of the tubular ring to compress the corresponding ends of the folds 8 therein towards the axis of the tubular ring, as indicated by the arrows in Figure 10.

This intermediate stamping operation may be performed as follows: the tubular ring is placed in a die or support 12, see Figure 12, which has a tapered part and radial grooves 13, more clearly apparent in Figure 13, designed to receive the folds 8 of the tubular ring. Axially movable relatively to the die 12 in a vertical direction is a punch element 10 formed with a tapered end portion complementary to the hollow tapered part of the die, and a circumferential shoulder 11 designed to bear on the free ends of the folds 8 in the tubular ring.

It will be noted that Figure 12 illustrates a cross section on the plane XII—XII of Figure 13, showing additionally the tubular ring and the punch member 10. Thus it will be readily understood that when the punch 10 is actuated vertically downwards as indicated by the arrow, the shoulder 11 thereof will push the folded tubular ring downwards and the hollowed tapered cavity in the die will at the same time force the lower ends of the folds 8 inwards, which are guided by the radial grooves 13 as schematically indicated by arrows Fig. 10. In this way an intermediate stamping is obtained which is shaped as indicated in Figure 11.

From this intermediate stamping a final stamping of the raw annular spring is made using equipment of the type illustrated either in Figures 14 and 15, or in Figures 16 and 17.

In the form shown in Figures 14 and 15, the press equipment includes a die 14 having an upwardly truncated conical portion with radial grooves 16 which, when viewed in plan, will appear as shown in Figure 18. The punch 15 has a form complementary to die 14. In one closing movement of the punch 15, there are two simultaneous operations: the conical form of punch 15 being complementary to the conical form of die 14 gives, by stamping, the final conical profile (rectilinear) to the sectors of the raw annular spring. Simultaneously folds 8' are calibrated by lodging in the grooves 16 and assume the final form of pockets 3.

In the form shown in Figures 16 and 17, similar equipment as represented by Figures 14 and 15 is used, but die 14' and punch 15' have curved instead of rectilinear profiles and are complementary so as to obtain a curved sector profile as shown in Figure 7.

On completion of the stamping operation described with reference either to Figures 14 and 15, or Figures 16 and 17, the stamping may be passed to a machining operation wherein the slots such as 7 in Figure 1 or in Figure 3 are formed in any conventional way, as by turning, milling, grinding and the like.

It will be understood that the invention is not to be considered as restricted to the details illustrated and described. The new annular spring may assume widely different forms as may be required by the intended use thereof, and also the equipment and method used in manufacturing such springs may differ from what has been specifically shown herein.

I claim:

1. An annular spring having an integral body portion formed from a resilient material with an outer peripheral edge and an inner peripheral edge, said body portion being defined by a plurality of circumferentially spaced-apart identical sectors extending radially from said inner peripheral edge to said outer peripheral edge and retroverted wall portions extending from one axial face only of said sectors integrally interconnecting said sectors and defining pockets between said sectors, each of said pockets extending along a radial line but terminating short of at least one of said peripheral edges of the body portion to define a radial slot along which said sectors are free from interconnection.

2. An annular spring having an integral body portion formed from a resilient material with an outer peripheral edge and an inner peripheral edge, said body portion being defined by a plurality of circumferentially spaced-apart identical sectors extending radially from said inner peripheral edge to said outer peripheral edge and retroverted wall portions extending from one axial face only of said sectors integrally interconnecting said sectors and defining pockets between said sectors, each of said pockets extending along a radial line but terminating short of at least the inner peripheral edge of the body portion to define a radial slot along which said sectors are free from interconnection.

3. An annular spring having an integral body portion formed from a resilient material with an outer peripheral edge and an inner peripheral edge, said body portion being defined by a plurality of circumferentially spaced-apart identical sectors extending radially from said inner peripheral edge to said outer peripheral edge and retroverted wall portions extending from one axial face only of said sectors integrally interconnecting said sectors and defining pockets between said sectors, each of said pockets extending along a radial line but terminating short of at least the outer peripheral edge of the body portion to define a radial slot along which said sectors are free from interconnection.

4. An annular spring having an integral body portion formed from a resilient material with an outer peripheral edge and an inner peripheral edge, said body portion being defined by a plurality of circumferentially spaced-apart identical sectors extending radially from said inner peripheral edge to said outer peripheral edge and retroverted wall portions extending from one axial face only of said sectors integrally interconnecting said sectors and defining pockets between said sectors, each of said pockets extending along a radial line but terminating short of the outer peripheral edge and short of the inner peripheral edge of the body portion to define a radial slot along which said sectors are free from interconnection.

5. An annular spring having an integral body portion formed from a resilient material with an outer peripheral edge and an inner peripheral edge, said body portion being defined by a plurality of circumferentially spaced-apart identical sectors extending radially from said inner peripheral edge to said outer peripheral edge and retroverted wall portions extending from one axial face only of said sectors integrally interconnecting said sectors and defining pockets between said sectors, each of said pockets extending along a radial line but terminating short of at least one of said peripheral edges of the body portion to define a radial slot along which said sectors are free from interconnection, each pocket being formed symmetrically with respect to a plane passing through the geometrical axis of the annular spring.

6. An annular spring having an integral body portion formed from a resilient material with an outer peripheral edge and an inner peripheral edge, said body portion being defined by a plurality of circumferentially spaced-apart identical sectors extending radially from said inner peripheral edge to said outer peripheral edge and retroverted wall portions extending from one axial face only of said sectors integrally interconnecting said sectors and defining pockets between said sectors, each of said pockets extending along a radial line but terminating short of at least one of said peripheral edges of the body portion to define a radial slot along which said sectors are free from interconnection, each of said pockets being partially flattened symmetrically.

7. An annular spring having an integral body portion formed from a resilient material with an outer peripheral edge and an inner peripheral edge, said body portion being defined by a plurality of circumferentially spaced-apart identical sectors extending radially from said inner peripheral edge to said outer peripheral edge and retroverted wall portions extending from one axial face only of said sectors integrally interconnecting said sectors and defining pockets between said sectors, each of said pockets extending along a radial line but terminating short of at least one of said peripheral edges of the body portion to define a radial slot along which said sectors are free from interconnection, said sectors having curved axial surfaces.

8. An annular spring having an integral body portion formed from a resilient material with an outer peripheral edge and an inner peripheral edge, said body portion being defined by a plurality of circumferentially spaced-apart identical sectors extending radially from said inner peripheral edge to said outer peripheral edge and retroverted wall portions extending from one axial face only of said sectors integrally interconnecting said sectors and defining pockets between said sectors, each of said pockets extending along a radial line but terminating short of said peripheral edges of the body portion to define a radial slot along which said sectors are free from interconnection, and each of said pockets extending radially beyond the other of said peripheral edges.

9. A process of making annular springs which comprises the steps of folding a metal strip to define a plurality of equally spaced-apart folds, bending the resulting folded strip into an annular form, welding the adjacent ends to form a folded tubular ring with said folds extending parallel to the geometrical axis of said tubular ring, pressing said ring into a conical annular member while retaining said folds, further pressing the conical member into the form of a folded annular member of only slight conicity, and cutting away a portion of said pockets from at least one peripheral edge of said last-named member along radial lines.

References Cited in the file of this patent

UNITED STATES PATENTS

| | | |
|---|---|---|
| 2,010,649 | Spencer | Aug. 6, 1935 |
| 2,361,193 | Gray | Oct. 24, 1944 |
| 2,630,897 | Porter | Mar. 10, 1953 |
| 2,639,948 | Grimshaw | May 26, 1953 |